US009444545B2

United States Patent
Norman et al.

(10) Patent No.: US 9,444,545 B2
(45) Date of Patent: Sep. 13, 2016

(54) SYSTEM AND METHOD FOR NON-CONTACT IDENTIFICATION OF A PASSIVE TARGET

(71) Applicant: The Boeing Company, Huntington Beach, CA (US)

(72) Inventors: Jeffrey B. Norman, Newbury Park, CA (US); Harold N. Seiden, Newbury Park, CA (US); Kenneth C. Widen, Topanga, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/570,196

(22) Filed: Dec. 15, 2014

(65) Prior Publication Data

US 2016/0173196 A1    Jun. 16, 2016

(51) Int. Cl.
| | | |
|---|---|---|
| H04B 10/08 | (2006.01) | |
| H04B 17/00 | (2015.01) | |
| H04B 10/00 | (2013.01) | |
| H04B 10/077 | (2013.01) | |
| H04B 10/50 | (2013.01) | |
| H04B 10/67 | (2013.01) | |
| G01S 17/02 | (2006.01) | |

(52) U.S. Cl.
CPC ......... *H04B 10/0775* (2013.01); *G01S 17/026* (2013.01); *H04B 10/503* (2013.01); *H04B 10/671* (2013.01)

(58) Field of Classification Search
CPC .......... H04B 10/2587; H04B 10/2569; G01S 13/756; H01Q 3/46
See application file for complete search history.

(56) References Cited

U.S. PATENT DOCUMENTS

| | | | | |
|---|---|---|---|---|
| 3,631,254 A | | 12/1971 | Covault | |
| 4,134,008 A | * | 1/1979 | de Corlieu | G01S 17/74 342/45 |
| 4,992,797 A | | 2/1991 | Gjessing et al. | |
| 5,583,507 A | * | 12/1996 | D'Isepo | G01S 13/756 342/45 |
| 5,790,291 A | * | 8/1998 | Britz | H04B 10/11 250/206.1 |
| 6,404,366 B1 | * | 6/2002 | Clark | G02F 7/00 341/137 |
| 6,509,985 B1 | * | 1/2003 | Kajita | H04J 14/06 398/154 |
| 7,116,419 B1 | * | 10/2006 | Weiner | G01J 3/447 356/364 |
| 8,274,727 B1 | * | 9/2012 | Yap | G02B 5/128 235/454 |

(Continued)

OTHER PUBLICATIONS

Montana University, Polarization, Fall 2011, pp. 1-7.*

*Primary Examiner* — David Payne
*Assistant Examiner* — Pranesh Barua
(74) *Attorney, Agent, or Firm* — Patterson & Sheridan, LLP (57) ABSTRACT

A system and method includes a laser transmitter configured to form a transmitted laser beam and a laser receiver configured to receive a reflected beam based on the transmitted laser beam. An identification (ID)-filter includes a substrate, a retarder filter and a reflector, where the transmitted beam passes through the retarder filter and is reflected back through the retarder filter in an opposite direction, to the laser receiver. A processor connected with a memory executes instructions stored in the memory to determine polarization properties of the reflected beam with respect to the transmitted laser beam to determine an address of the ID-filter.

15 Claims, 7 Drawing Sheets

(56) References Cited

U.S. PATENT DOCUMENTS

| | | | |
|---|---|---|---|
| 2003/0075676 A1* | 4/2003 | Ruchet | G01J 4/02 250/225 |
| 2003/0147651 A1* | 8/2003 | Roes | F41G 3/2655 398/108 |
| 2003/0219250 A1* | 11/2003 | Wein | H04B 10/07955 398/26 |
| 2004/0129867 A1* | 7/2004 | Mackey | G01B 11/168 250/225 |
| 2007/0133997 A1* | 6/2007 | Werner | H04B 10/2569 398/147 |
| 2009/0202254 A1* | 8/2009 | Majumdar | H04B 10/1123 398/140 |
| 2009/0285583 A1* | 11/2009 | Winker | H04B 10/2587 398/152 |
| 2010/0066929 A1* | 3/2010 | Shemo | G02B 5/3083 349/18 |

\* cited by examiner

SYSTEM AND METHOD FOR NON-CONTACT IDENTIFICATION OF A PASSIVE TARGET

FIELD

The systems and methods relate to identification of targets, including non-contact identification of passive targets.

BACKGROUND

An existing solution for remote, non-contact object identification is Radio Frequency Identification (RFID), which uses radio frequency radiation and a tag on the object to be identified with a reader. Active RFID tags require a source of electrical power to generate the signal to be transmitted to the reader, so the system is not passive. Passive RFID uses a passive identification tag, but the range of this technique can be limiting. Another set of techniques for remote object identification use reflectors that are illuminated by a light source and that actively modulate the amount of light reflected back to the light source. One drawback is that electrical power to the reflectors is required. Another drawback is that the technique relies on active modulation of the light and therefore any light variation due to disturbances of the index of refraction of the intervening medium can mask the desired signal.

SUMMARY

According to one aspect, systems and methods can provide for a laser transmitter configured to form a transmitted laser beam and a laser receiver configured to receive a reflected beam based on the transmitted laser beam. An identification (ID)—filter includes an optical retarder element, an optical linear polarization element and a retroreflecting optical element. An embodiment of an ID-filter with reduced operation includes a retarder optical element and retroreflecting element but no linear polarization optical element. A first transmitted beam with a specified wavelength passes through the retarder element and the retroreflecting element reflects the first beam back through the retarder element in the opposite direction, to the laser receiver. A second transmitted beam with a specified wavelength that is distinct from that of the first beam passes through the linear polarization element and the retroreflecting element reflects the second beam back through the polarization element in the opposite direction, to the laser receiver. A polarimeter and processor connected with a memory executes instructions stored in the memory to determine polarization properties of the first and second reflected beams with respect to the first and second transmitted laser beams, respectively, to determine an address of the ID-filter.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

DETAILED DESCRIPTION

Systems and methods are described for identifying a distant object equipped with a passively reflective device. No source of electrical power is needed at the location of the identified object to identify the object. The reflective device may include a filter having determined characteristics and a retro-reflector. An interrogation laser beam is sent to the reflective device. The beam passes through the filter, reflects back, passes through the filter a second time and returns to the interrogator. Object identification can occur in cases where the light propagation medium between the interrogator and the object to be identified includes disturbances or long distances that preclude the use of optical feature imaging. The returning beam is analyzed with respect to the determined characteristics of the filter. Standoff ranges on the order of, e.g., 100's of kilometers may be achieved. Remote object identification is offered with a field of view narrower than is possible with radio frequency based techniques, e.g., due to the use of light wavelengths and the correspondingly smaller diffraction angles.

Figure 1:
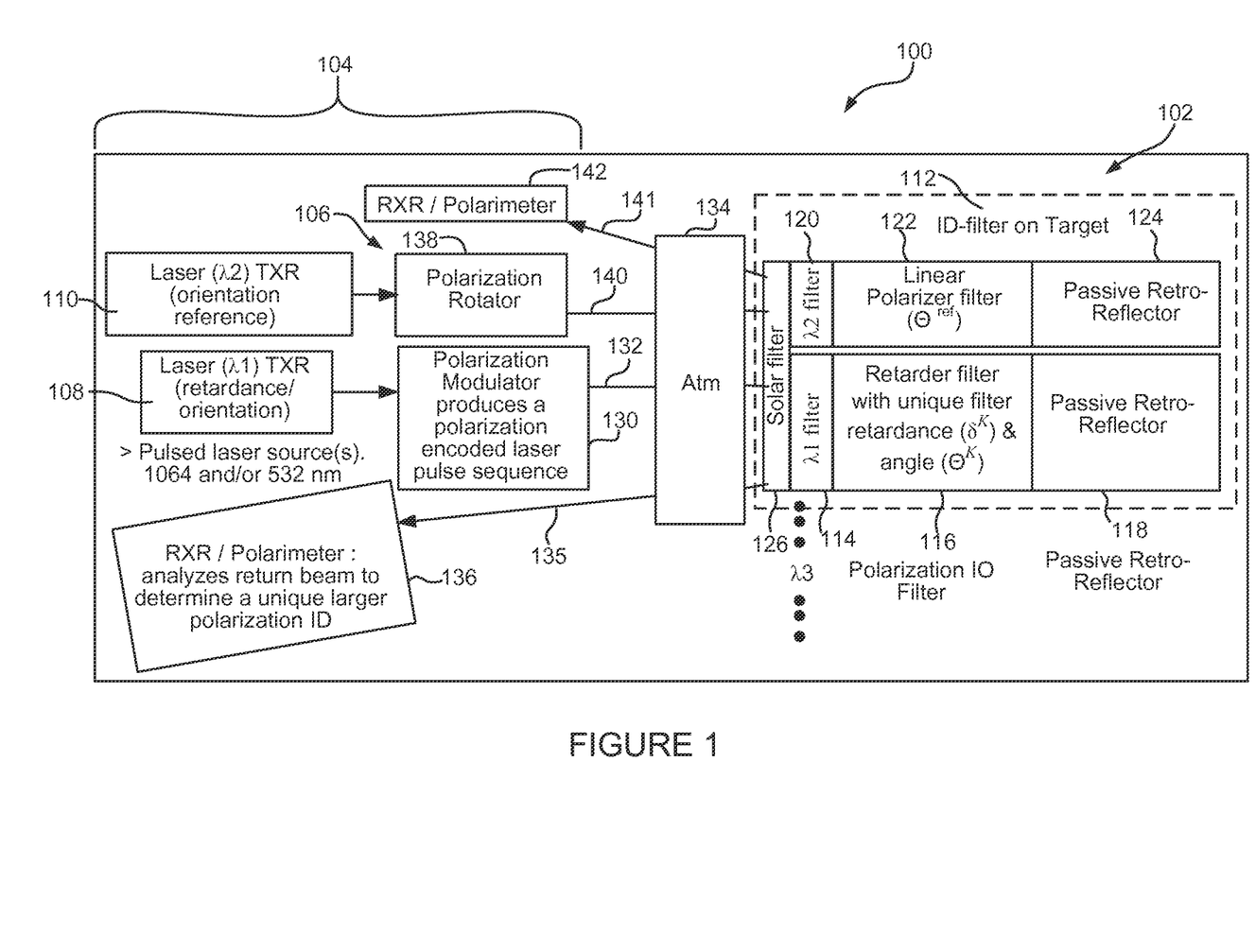
FIG. 1 is a block diagram of an exemplary environment for identifying a target.

FIG. 1 is a block diagram of an exemplary environment 100 for identifying a target 102. The target 102 can be located in various environments, e.g., on land, in the air, in interstellar space, in the water, etc. An interrogator 104 sends an interrogation signal 106 to an identification (ID)-filter 112 located on the target 102, e.g., to determine an identity of the target 102 based on the ID-filter 112. The interrogator 104 and the target 102 can be located on land, in the air, in space, in the water, etc. For example, the laser 108 and/or laser 110 of the interrogator 104 can be located on an aircraft to identify the target 102, e.g., a vehicle travelling by ground, or vice versa. The interrogator 104 includes an interrogation signal generated by a light source, e.g., a laser beam generated by laser 108 or laser 108 and laser 110 aimed at the ID-filter 112.

The ID-filter 112 may include a wavelength $\lambda 1$ filter 114, a polarization filter 116, also referred to as an optical retarder, and a retro-reflector or retro-reflector array 118. The $\lambda 1$ filter 114 can filter the laser pulse sequence 132 as the $\lambda 1$ wavelength before the laser pulse sequence 132 reaches the polarization filter 116. Other types of reflector may be used. Additionally or alternatively, to provide additional identification addresses the ID-filter 112 may include a wavelength $\lambda 2$ filter 120, a linear polarizer 122, also referred to as a polarization orientation filter, and a second retro-reflector or retro-reflector array 124, as described in more detail below. The λ2 filter 120 can filter the polarized signal 140 as the λ2 wavelength before the polarized signal 140 reaches the linear polarizer 122.

Additional optical retarders may be used with each ID-filter 112, e.g., a λ3 filter, a λ4 filter, etc., each having filter retardance or polarization orientation qualities. Only one linear polarization filter is needed for multiple retarders, with the linear polarizer providing a single reference direction for all of the retarders. Additionally, the ID-filter 112 may include a solar filter 126 to filter out light from the sun for determined implementations. Unique identification properties can be determined for each ID-filter 112, either using retardance alone using the retarder filter(s) 116 (λ1, λ3, λ4, etc.), or retardance combined with axis orientation by adding the linear polarizer 122 (λ2). The ID-filter 112 properties can take into account determined operating conditions, e.g., an angle of incidence range, the depolarization environment and the number of unique addresses to be utilized.

Interrogation with a determined laser pulse polarization sequence at λ1 and polarized detections yields a unique ID for the target 102. The additional laser wavelength λ2 with spectral filter and linear polarizer may be used for assessment of retarder orientation relative to the linear polarizer for additional addresses. Additionally or alternatively, each polarization filter 116 (λ1, λ3, λ4, etc.) can have its own unique retardance values at distinct wavelengths in order to expand the number of available addresses used to identify the target 102, e.g., to distinguish between different targets 102. The ID-filter 112 can be manufactured from a single retarder filter 116 and a single linear polarizer 122 for each retardance/orientation pair. Alternatively, the ID-filter 112 may include more than one retarder filter 116. Example configurations can include a single retarder filter 116, a single retarder filter 116 with a linear polarizer 122, multiple retarder filters 116 (λ1, λ3, λ4, etc.) at multiple wavelengths without a linear polarizer 122, multiple retarder filters 116 (λ1, λ3, λ4, etc.) with a linear polarizer 122. If a linear polarizer 122 is used, the linear polarizer 122 can be installed on the target 102 to be identified at a determined orientation relative to the retarder filter 116. Multiple retarder filters 116 can be installed on a single target 102, each retarder filter 116 having a unique spectral bandpass and a unique retardance in order to achieve a desired number of unique addresses. A single linear polarizer 122 can be used for each set of retarder filters 116 placed on the target 102. Various design choices can be implemented for the retarder filter 116, e.g., a zero-order waveplate, a multi-order waveplate, a quarter-wave plate pair, compound retarders, etc. Designs can include electro-optic components for which the retardance and orientation properties of the filter can be set prior to installation and/or during operation.

The interrogation signals 106 are propagated from the interrogator 104 to the ID-filter 112 in order to measure the characteristics of the ID-filter 112. Light from laser 108 is pre-conditioned by polarization modulator 130 to produce a polarization-encoded laser pulse sequence 132. The polarization-encoded laser pulse sequence 132 passes through the atmosphere 134, or other medium such as water, the vacuum of space, etc., to reach the ID-filter 112. At the ID-filter 112 a polarization-encoded laser pulse sequence 132 passes through the optional solar filter 126 and the λ1 filter 114, e.g., retarder filter 116, and a phase changed laser pulse sequence 135 is reflected back by the retro-reflector 118 to a receiver/polarimeter 136. The returned retardance beam light is analyzed to determine the unique polarization ID, e.g., unique filter retardance $\delta^k$ and retarder orientation $\Theta^k_{ret}$.

The polarization ID is associated with the target 102 to identify the target 102. The association of polarization ID's to the target 102 can be stored in a memory located locally and/or remotely from the interrogator 104.

A second laser 110 can be used to determine an orientation property of the ID-filter, e.g., to add more unique addresses to the ID-filter 112. A light beam from laser 110 can be polarized by a polarization rotator 138 to produce linearly polarized signal 140. Light beams from the laser 108 and laser 110 having the appropriate polarization properties at each desired wavelength, e.g., 1064 nm and or 532 nm can be propagated to the ID-filter 112 in parallel or serially. The polarized signal 140 passes through the optional solar filter 126 and the λ2 filter 120 and the returned signal 141 is reflected back by retro-reflector 124 to receiver/polarimeter 142. The returned signal 141 is analyzed to determine the orientation angle of the linear polarizer $\Theta^k_{pol}$ relative to the interrogator axes. For example, polarization states of the returned signal 141 are compared to those of the polarized signal 140 that was sent to the ID-filter 112 to determine an orientation of the linear polarizer 122. The relationship between $\Theta^k_{ret}$ and $\Theta^k_{pol}$ for the ID-filter 112 is established at the time of manufacturing the ID-filter 112 to later determine the angle of retardance $\Theta^k_{ret}$ from $\Theta^k_{pol}$. Propagations of the light beams and detections of the returned signals are repeated for a determined number of beam polarization states at each λ wavelength. The number of beam polarization states at each wavelength is used to uniquely determine the retardance and orientation of the ID filter 112. The outgoing and returned beam light polarization states are analytically converted to ID filter retardance and orientation properties to determine the unique ID. The analysis can be performed after the measurement of each beam polarization state or after the complete set of beam states has been measured.

Figure 2:
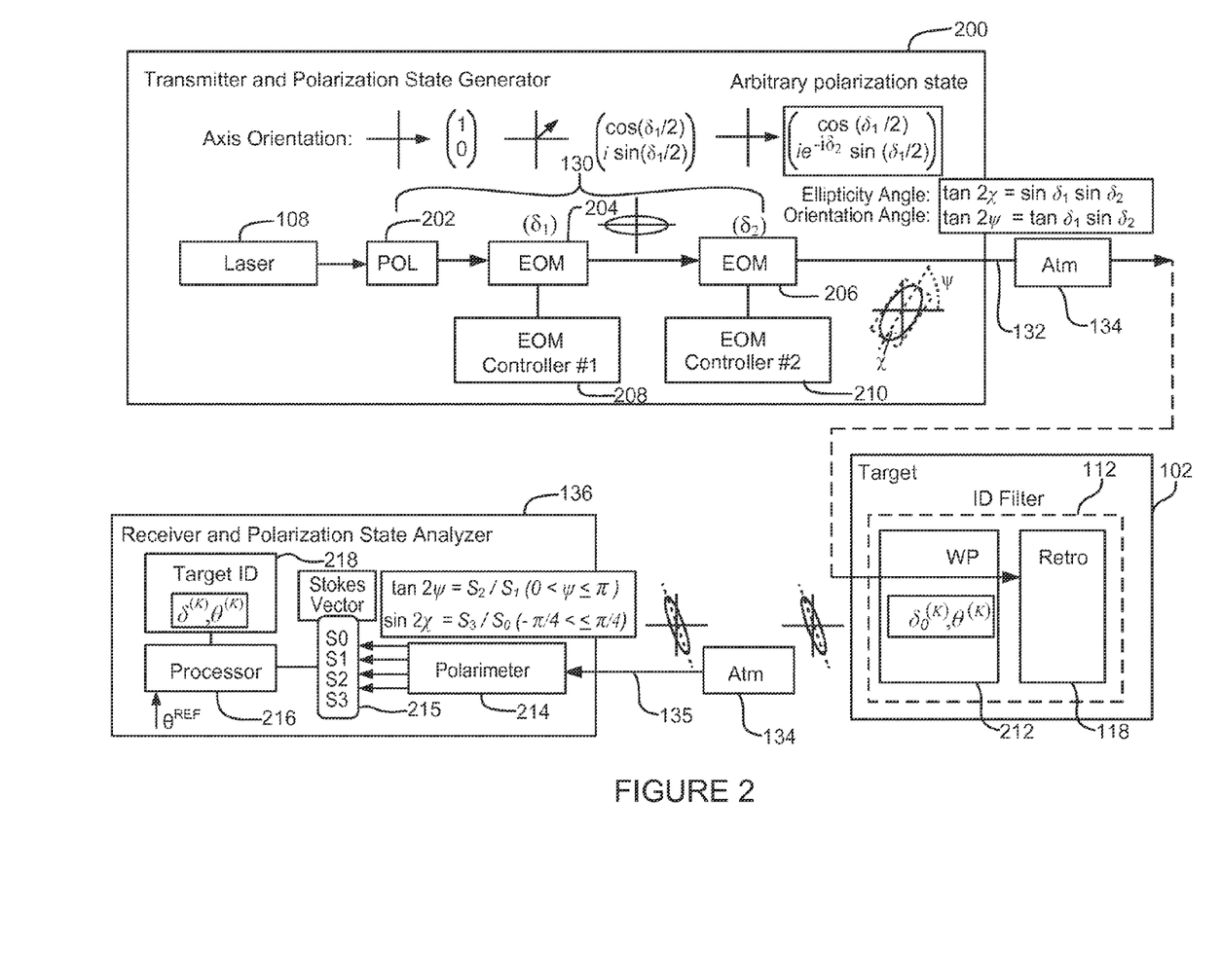
FIG. 2 is a block diagram of an example of a target identification.

FIG. 2 is a block diagram of an example of a target identification using a retarder filter without a linear polarizer. The transmitter and polarization state generator 200 includes the laser 108 and polarization modulator 130 (FIG. 1). The polarization modulator 130 may include a linear polarizer 202, a first electro-optic phase modulator (EOM) (δ1) 204, a second electro-optic phase modulator (EOM) (δ2) 206, a first EOM controller 208 and a second EOM controller 210 to vary the polarization states of the laser beams. The ellipticity angle is determined from tan 2χ=sin δ$_1$ sin δ$_2$ and the orientation angle is determined from tan 2Ψ=tan δ$_1$ sin δ$_2$. The EOM 204 and EOM 206 may be replaced with optics that are manually changed.

The polarization-encoded laser pulse sequence 132 passes through the atmosphere 134 to the target 102 which has an ID-filter 112 placed with it. The polarization-encoded laser pulse sequence 132 passes through waveplate 212, e.g., the polarization filter 116 (FIG. 1), with $d^k$ retardance and $\Theta_{ret}$ orientation properties. The phase changed laser pulse sequence 135, as determined by the properties of the waveplate 212, is reflected back through the waveplate 212 by retro-reflector 118. The receiver (RXR)/polarimeter 136 receives the phase changed laser pulse sequence 135 which can be analyzed to identify the target 102. The receiver (RXR)/polarimeter 136 can include a polarimeter 214 and processor 216. The polarimeter 214 outputs a Stokes vector 215 to the processor 216 and the processor determines the target ID properties 218 ($\delta^k$, $\Theta_{ret}^k$) based on an algorithm, for example the following algorithm, to identify the target 102.

Figure 3:
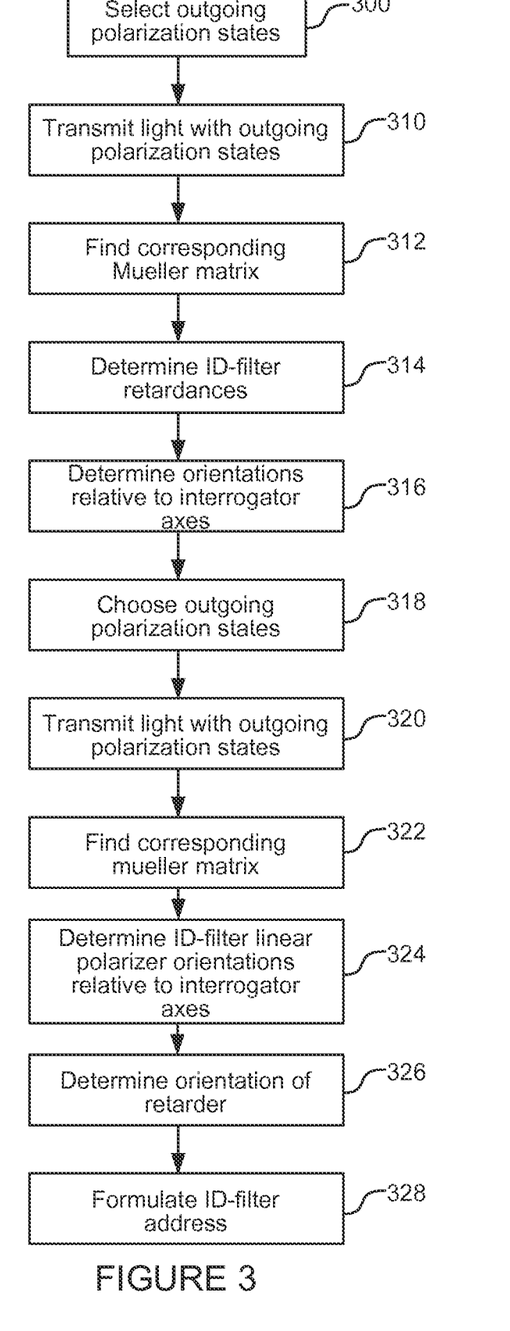
FIG. 3 is a flowchart of an exemplary measurement algorithm.

FIG. 3 is a flowchart of an exemplary measurement algorithm. The algorithm assumes that the outgoing and incoming polarization states for the retarder and linear polarizer portions of the ID-filter are known, the latter from polarimeter measurements.

Select the outgoing polarization states for the retardance measurement based on a minimum of four states with the actual number of states, n, determined by factors such as signal-to-noise ratio, measurement time constraints, or other considerations. The outgoing polarization states) are represented by a 4×n matrix containing the Stokes vectors: $\hat{S}_{in} = [\vec{S}_{in}^{(1)} \ldots \vec{S}_{in}^{(n)}]$ (300).

Transmit light with the outgoing polarization states, and within the wavelength transmission band of the retarder, to the ID-filter and measure the corresponding returning polarization states with a polarimeter. The returning polarization states are represented by a 4×n matrix containing the Stokes vectors: $\hat{S}_{out} = [\vec{S}_{out}^{(1)} \ldots \vec{S}_{out}^{(n)}]$ (310).

Use a least squares minimization approach to find the Mueller matrix corresponding to the optical retardance of the ID-filter, e.g., $$M_{ret} = \hat{S}_{out}\hat{S}_{in}^T(\hat{S}_{in}\hat{S}_{in}^T)^+,$$

where $(S_{in}S_{in}^T)^+$ denotes the Moore-Penrose pseudoinverse of $S_{in}S_{in}^T$ (312).

Determine the ID-filter retardance from the Mueller matrix elements, e.g., $\delta = \cos^{-1} M_{44}$, where $0 \le \delta \le \pi/2$ (314).

Determine the orientation of the ID-filter retarder relative to the interrogator axes from the Mueller matrix elements, e.g., $$\theta_{ret} = \frac{1}{2}\sin^{-1}\left[\frac{M_{42}}{(1-M_{44}^2)^{1/2}}\right]. \quad (316)$$

Choose the outgoing polarization states for the linear polarizer axis measurement based on a minimum of three states with the actual number of states, n, determined by factors such as signal-to-noise ratio, measurement time constraints, or other considerations. The outgoing polarization states are represented by a 4×n matrix containing the Stokes vectors: $\hat{S}_{in} = [\vec{S}_{in}^{(1)} \ldots \vec{S}_{in}^{(n)}]$ (318).

Transmit light with the selected outgoing polarization states, and within the wavelength transmission band of the linear polarizer, to the ID-filter and measure the corresponding returning polarization states with a polarimeter. The returning polarization states are represented by a 4×n matrix containing the Stokes vectors: $\hat{S}_{out} = [\vec{S}_{out}^{(1)} \ldots \vec{S}_{out}^{(n)}]$ (320).

Use a least squares minimization approach to find the Mueller matrix corresponding to the linear polarizer portion of the ID-filter, e.g., $$M_{pol} = \hat{S}_{out}\hat{S}_{in}^T(\hat{S}_{in}\hat{S}_{in}^T)^+,$$

where $(S_{in}S_{in}^T)^+$ denotes the Moore-Penrose pseudoinverse of $S_{in}S_{in}^T$ (322).

Determine the ID-filter linear polarizer orientation relative to the interrogator axes from the Mueller matrix elements determined in step 8, e.g., $\theta_{pol} = 0.5 \sin^{-1}(2M_{13})$, where $0 \le \theta_{pol} \le \pi$ (324).

Determine the orientation of the retarder relative to the linear polarizer orientation, $\theta = \theta_{pol} - \theta_{ret}$ (326).

Formulate the ID-filter address, $[\delta, \theta]$ (328).

An objective of the ID-filter measurement algorithm is to determine the address of an individual ID-filter 112 from a set of measurements using light sources with specified input and measured output polarization states. The ID-filter 112 includes a retarder 116 and a linear polarizer 122, along with wavelength filters 114, 120 and retro-reflector elements 118, 124. Each ID-filter address includes two quantitative properties of the filter, optical retardance of the retarder and orientation of the retarder relative to the linear polarizer. Retardance and orientation have units of degrees or radians. Together, these two filter properties provide a constellation of unique addresses. The total number of unique addresses that are possible using a single filter on a target object is the product of the number of distinct filter retardances and the number of distinct linear polarizer/retarder relative orientations that can be achieved. The address of an ID-filter 112 attached to a target object can be determined by interrogating the ID-filter 112 with light sources (e.g., lasers) with specified polarization states and measuring the polarization states of the light returned (reflected) from the filter.

The retarder 116 and linear polarizer 122 are responsive to different light wavelength bands so that each can be interrogated without interference from light reflecting from the other element. A measurement of the retardance at the retarder response wavelength also results in a measurement of the orientation of the fast axis of the retarder, but this orientation is only relative to axes that were used to provide the input polarizations and is not relative to the polarizer axis, as is used for it to be a useful address factor. The axes used to define input polarizations can be referred to as the interrogator axes. In a separate measurement, the linear polarizer axis is determined relative to the interrogator axes using a light source with a wavelength in the polarizer response band and with a set of linear polarization states. Once the polarizer and retarder orientations are both known relative to the interrogator axes, they are automatically known relative to each other and this relative orientation can be used as an address factor.

For each of the retarder and the polarizer measurements, the input and output polarization states can be represented by 4-element Stokes vectors, $S_{in}$ and $S_{out}$. A Stokes vector can be written in terms of the ellipticity angle, $\chi$, and orientation angle, $\Psi$, of the polarization state ellipse of the light.

$$S = \begin{pmatrix} S_1 \\ S_2 \\ S_2 \\ S_3 \end{pmatrix} = S_0 \begin{pmatrix} 1 \\ \cos2\chi\cos2\psi \\ \cos2\chi\sin2\psi \\ \sin2\chi \end{pmatrix}$$

It follows that the ellipticity and orientation angles can be written in terms of the Stokes elements:

$$\chi_{out} = \frac{1}{2}\sin^{-1}(S_3/S_0),$$

-continued $(-\pi/4 < \psi \le \pi/4)$, $\psi_{out} = \frac{1}{2}\tan^{-1}(S_2/S_1)$, $(0 < \psi \le \pi)$.

Retardance and Retarder Orientation Measurements:

The retarder portion of the ID filter can be represented by a 4×4 Mueller matrix, $M_{ret}$, and the process of light interacting with the retarder filter is represented by $$M_{ret}S_{in}=S_{out}.$$

One embodiment of the ID-filter 112 is a compound optical element in which the retardance is provided by a retarder optic with its own wavelength filter and retro-reflecting optic and the linear polarizer portion is a polarizer optic with its own wavelength filter and retro-reflector optic. In retarder measurements, the interrogating light transmits through the retarder optic, reflects off the retro-reflector, and then transmits back through the retarder optic in the opposite direction. $M_{ret}$ represents a Mueller matrix that includes the combined effects of these three operations and can be written as if the retardance operation were provided by a single optical retarder transformation. The portion of the ID Filter that results in a net change in retardance of the incident light is referred to as the 'retarder.' The retarder can be a linear retarder or circular retarder. For the case of a linear retarder, the Mueller matrix can be written in terms of total retardance, $\delta$, and orientation $\theta_{ret}$:

$$M_{ret} = \begin{bmatrix} 1 & 0 & 0 & 0 \\ 0 & \cos4\theta_{ret}\sin^2(\delta/2)+\cos^2(\delta/2) & \sin4\theta_{ret}(\delta/2) & -\sin2\theta_{ret}\sin\delta \\ 0 & \sin4\theta_{ret}\sin^2(\delta/2) & -\cos4\theta_{ret}\sin^2(\delta/2)+\cos^2(\delta/2) & \cos2\theta_{ret}\sin\delta \\ 0 & \sin2\theta_{ret}\sin^2\delta & -\cos2\theta_{ret}\sin\delta & \cos\delta \end{bmatrix}.$$

As discussed above, $\theta_{ret}$ is defined here relative to the interrogator axes and is useful as an address only when known relative to the ID Filter linear polarizer orientation, whose measurement is discussed below.

The ID Filter retardance and orientation are contained in the elements of the measured Mueller matrix, so the algorithm entails solving the matrix equation $M_{ret}S_{in}=S_{out}$ for $M_{ret}$ using the known input and measured output polarization states, $S_{in}$ and $S_{out}$, and then using the elements of $M_{ret}$ to determine $\delta$ and $\theta_{ret}$.

The nature of the Mueller/Stokes description of polarization implies that at least four orthogonal polarization states are used to interrogate the filter in order to uniquely determine retardance and orientation. The measurement algorithm can be mathematically formulated by specifying a set of n input polarizations grouped as a 4×n matrix, $\hat{S}_{in}=[\vec{S}_{in}^{(1)} \ldots \vec{S}_{in}^{(n)}]$, and corresponding output polarizations $\hat{S}_{out}=[\vec{S}_{out}^{(1)} \ldots \vec{S}_{out}^{(n)}]$. For example, for a set of 6 polarizations $\hat{S}_{in}$ and $\hat{S}_{out}$ are 4×6 matrices and the filtering process $M_{ret}\hat{S}_{in}=\hat{S}_{out}$ represents a set of 24 equations from which the retardance and orientation are derived. This is a highly over-determined system of equations and so the optimal solution is found using a least squares minimization approach that can be formally written $$M_{ret}\hat{S}_{in}=\hat{S}_{out} \rightarrow M_{ret}\cdot\hat{S}_{in}\hat{S}_{in}^T=\hat{S}_{out}\hat{S}_{in}^T \rightarrow M_{ret}\hat{S}_{in}\hat{S}_{in}^T(\hat{S}_{in}\hat{S}_{in}^T)^+=\hat{S}_{out}\hat{S}_{in}^T(\hat{S}_{in}\hat{S}_{in}^T)^+ \rightarrow M_{ret}=\hat{S}_{out}\hat{S}_{in}^T(\hat{S}_{in}\hat{S}_{in}^T)^+.$$

$(S_{in}S_{in}^T)^+$ denotes the Moore-Penrose pseudoinverse. Note that the pseudoinverse of a general matrix, A, is $A^+=(A^TA)^{-1}A^T$, where $A^T$ is the transpose of A.

Once the retarder Mueller matrix elements are measured, the retardance and orientation can be obtained using the functionality of the Mueller matrix elements in terms of $\delta$ and $\theta_{ret}$. For example, using elements $M_{44}$ and $M_{42}$:

$$\delta = \cos^{-1}M_{44},$$

$$\theta_{ret} = \frac{1}{2}\sin^{-1}\left[\frac{M_{42}}{(1-M_{44}^2)^{1/2}}\right],$$

where $0 \le \delta \le \pi/2$ and $0 \le \theta_{ret} \le \pi$. One of the off-diagonal elements of $M_{ret}$ is used since the diagonal elements leave an ambiguity in the sign of $\theta_{ret}$ owing to the fact that they contain only cosine or squared cosine and sine factors. Additional Mueller matrix elements can be used to derive $\delta$ and $\theta_{ret}$ in order to reduce the effects of system noise. Interrogating the ID filter with additional input polarization states also improves measurement fidelity.

The following is a numerical example of the algorithm. Suppose the interrogator-specified input and measured output polarization states for a set of six measurements are described by:

$$\hat{S}_{in} = \begin{pmatrix} 1 & 1 & 1 & 1 & 1 & 1 \\ 1 & 0 & 0 & -1 & 0 & 0 \\ 0 & 1 & 0 & 0 & -1 & 0 \\ 0 & 0 & 1 & 0 & 0 & -1 \end{pmatrix},$$

$$\hat{S}_{out} = \begin{pmatrix} 1 & 1 & 1 & 1 & 1 & 1 \\ 0.9548 & 0.0261 & -0.2962 & 0.0261 & 0 & 0.2962 \\ 0.0261 & 0.9849 & 0.1710 & -0.0261 & -0.9849 & -0.1710 \\ 0.2962 & -0.1710 & 0.9397 & -0.2962 & 0.1710 & 0.9397 \end{pmatrix}.$$

$\hat{S}_{in}$ represents six input polarization states corresponding to its six columns: horizontal linear, linear at +45°, right-hand circular, vertical linear, linear at −45°, and left-hand circular (all relative to the interrogator axes). These polarization states are specified and prepared by the interrogator and the columns of $\hat{S}_{out}$ are the corresponding polarimeter measurements of the light returned from the filter. Applying the least squares minimization approach described above yields $$M_{ret} = \begin{pmatrix} 1 & 0 & 0 & 0 \\ 0 & 0.9548 & 0.0261 & -0.2962 \\ 0 & 0.0261 & 0.9849 & 0.1710 \\ 0 & 0.2962 & -0.1710 & 0.9397 \end{pmatrix},$$

from which the filter retardance and orientation can be obtained:

$$\delta = \cos^{-1} M_{44} = \cos^{-1}(0.9397) = 0.3490 \text{ rad} = 20.00°$$

$$\theta_{ret} = \frac{1}{2}\sin^{-1}\left[\frac{M_{42}}{(1-M_{44}^2)^{1/2}}\right] = \frac{1}{2}\sin^{-1}\left[\frac{0.2962}{\sqrt{1-(0.9397)^2}}\right] = 0.5236 \text{ rad} = 30.00°$$

Recall that this retarder orientation is only relative to axes used to define the original set of six input polarization states. In order to relate it to the axis of the ID Filter linear polarizer, the latter is measured relative to the interrogator axes. This can be done by interrogating the polarizer with a set of linear polarization states.

Linear Polarizer Orientation Measurement:

The Mueller matrix of the linear polarizer portion of the ID Filter is $$M_{pol} = \frac{1}{2}\begin{bmatrix} 1 & \cos2\theta_{pol} & \sin2\theta_{pol} & 0 \\ \cos2\theta_{pol} & \cos^2(2\theta_{pol}) & \cos2\theta_{pol}\sin2\theta_{pol} & 0 \\ \sin2\theta_{pol} & \cos2\theta_{pol}\sin2\theta_{pol} & \sin^2(2\theta_{pol}) & 0 \\ 0 & 0 & 0 & 0 \end{bmatrix},$$

where $\theta_{pol}$ is the orientation of the polarizer axis relative to the interrogator axes. As for the retardance measurement, the transformation from input to output polarization states can be expressed as $M_{pol}\hat{S}_{in}=\hat{S}_{out}$. A minimum of three input polarization states is required to measure $\theta_{pol}$. For example, if the input and output polarization states are $$\hat{S}_{in} = \begin{pmatrix} 1 & 1 & 1 \\ 1 & -1 & 0 \\ 0 & 0 & 1 \\ 0 & 0 & 0 \end{pmatrix},$$

$$\hat{S}_{out} = \begin{pmatrix} 0.3790 & 0.6210 & 0.0149 \\ -0.0917 & -0.1502 & -0.0036 \\ -0.3678 & -0.6025 & -0.0144 \\ 0 & 0 & 0 \end{pmatrix},$$

then the measured Mueller matrix is $$M_{pol} = \begin{pmatrix} 0.500 & 0.4373 & -0.2424 & 0 \\ 0.4373 & 0.3825 & -0.2120 & 0 \\ -0.2424 & -0.2120 & 0.1175 & 0 \\ 0 & 0 & 0 & 0 \end{pmatrix}.$$

Similar to the retardance part of the algorithm, the sign ambiguity in $\theta_{pol}$ can be avoided by using Mueller matrix elements that contain odd powers of $\sin2\theta_{pol}$. For example, using the $M_{13}$ Mueller matrix element, the polarizer orientation is:

$$\theta_{pol} = 0.5 \sin^{-1}(2M_{13}) = 0.5 \sin^{-1}[-0.4848] = -0.2531 \text{rad} = -14.50°$$

Note that $0 \leq \theta_{pol} \leq \pi$. As before, a higher fidelity result can be obtained by using additional Mueller matrix elements to calculate $\theta_{pol}$ and/or by using additional input polarization states.

The orientation portion of the ID Filter address, called θ, is the difference between $\theta_{ret}$ and $\theta_{pol}$. Since these two angles are both measured relative to the interrogator axes, their difference is a quantity that is independent of the interrogator axes and is therefore a property of the ID Filter itself. θ can be combined with the retardance measurement to form a complete ID Filter address:

Retardance=δ=0.3490rad=20.00°

Relative Orientation=θ=$\theta_{ret}$−$\theta_{pol}$=0.5236rad−(−0.2531rad)=0.7767rad=44.50°

ID-filter Address=[δ,θ]=[20.00°,44.50°]

Figure 4:
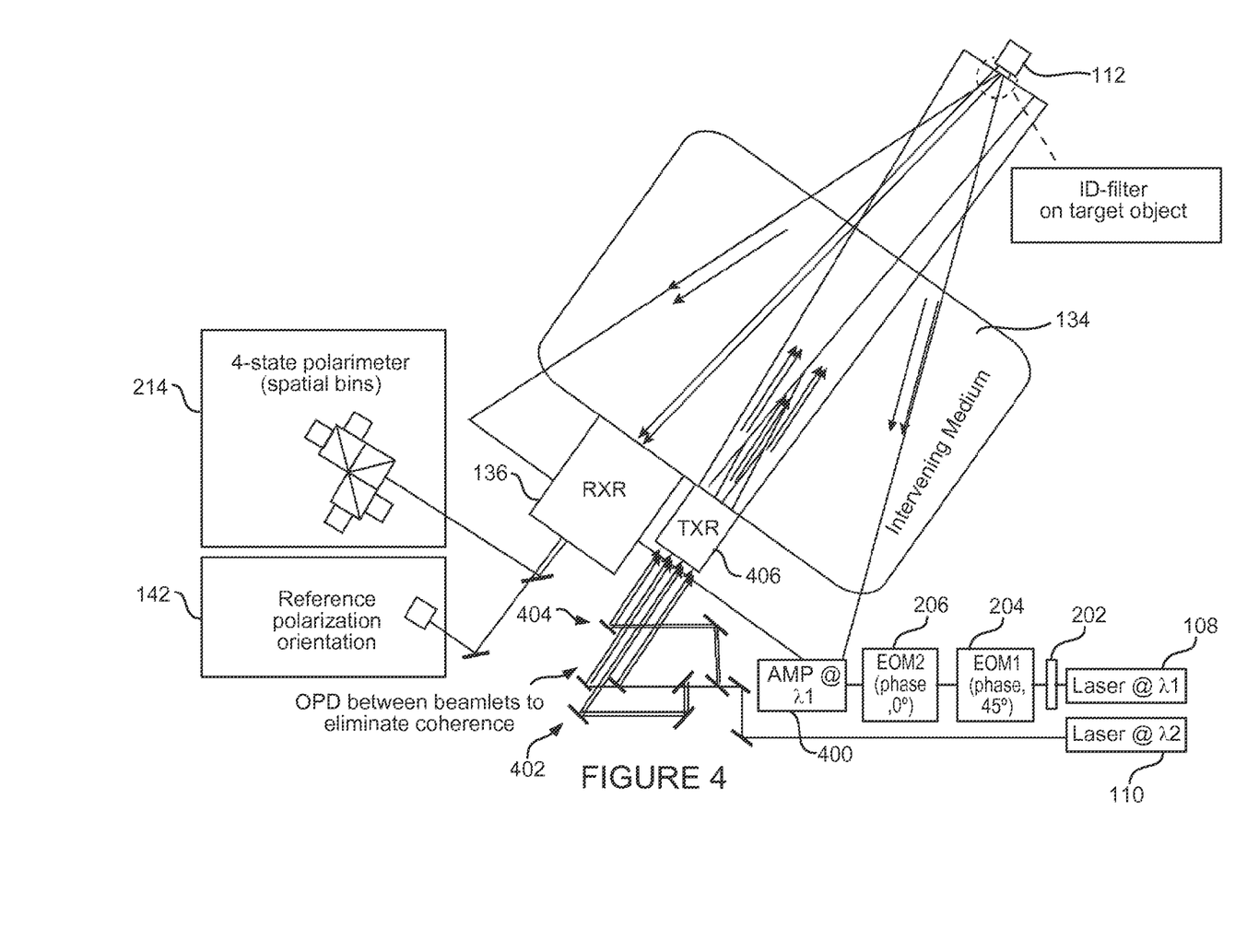
FIG. 4 is a block diagram of an example multi-probe beam transmitter to mitigate coherence effects for turbulent intervening media.

FIG. 4 is a block diagram of an example multi-probe beam transmitter to mitigate coherence effects for turbulent intervening media. In some implementations, an amplifier 400 and beam splitters 402 may be included with the laser transmitter 406 to split the beams into multiple states 404. Multiple probes can then be used, for example, in environments having turbulent media intervening between the transmitting laser 108/receiver (RXR)/polarimeter 136 and the ID-filter 112 on the target 102, or where an aperture of receiver (RXR)/polarimeter 136 is small. The polarimeter 214 can include a multi-state polarimeter. Alternatively, no beam splitters 402 and a single beam may be used if mitigation of turbulence is not a concern. As noted above, λ2 is also not needed, and additional retarders λ3, λ4, etc. may be added, e.g., depending on how many differing addresses are used in an implementation.

Figure 5:
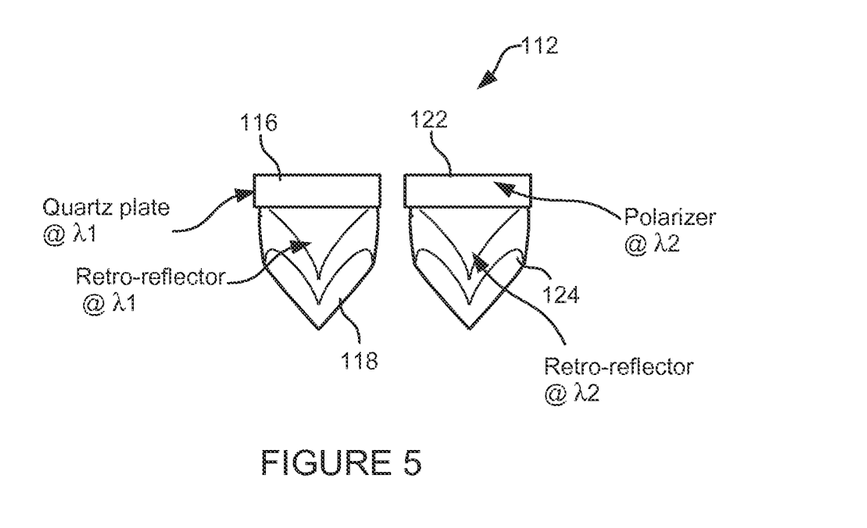
FIG. 5 is a diagram of an example ID-filter.

FIG. 5 is a diagram of an example ID-filter 112 having a polarization filter 116 and a linear polarizer 122. The polarization filter 116 can be implemented with a quartz retarder plate at wavelength λ1. A corresponding retro-reflector 118 at λ1 is positioned behind the polarization filter 116 so that the laser beam passes through the polarization filter 116 and then is reflected back towards the source of the beam and a receiver/polarimeter 136. Alternatively, the beam can be reflected in other directions to a receiver/polarimeter 136 if the receiver/polarimeter 136 is located in a different direction than the transmitter and polarization state generator 200. A corner cube retro-reflector is illustrated in FIG. 5, but other types of reflectors may be used, including spherical retro-reflectors. The optional linear polarizer 122 at wavelength λ2, positioned in front of a retro-reflector 124 at λ2, may be included with the polarization filter 116 to provide a reference angle $q_{pol}^k$ to determine an orientation of the polarization filter 116 to provide additional identification addresses.

Figure 6:
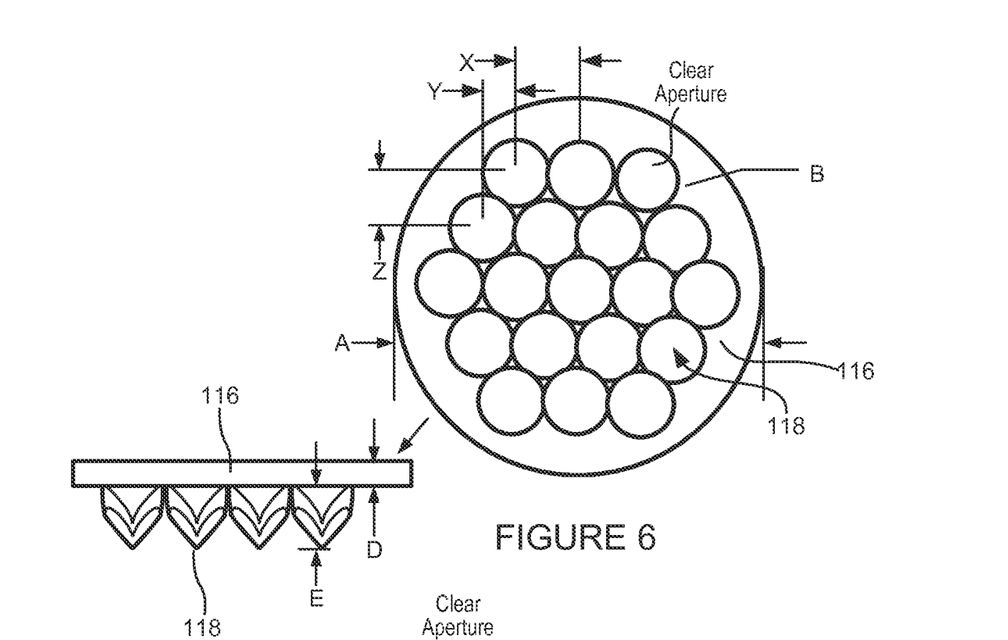
FIG. 6 is a diagram of an example top view and corresponding side view of an ID-filter with an optical retarder element and a retro-reflector array.

FIG. 6 is a diagram of an example top view and corresponding side view of an ID-filter 112 with a polarization filter 116 and a retro-reflector array 118. A single crystal quartz retarder window, e.g., retarder filter 116, can be positioned over the retro-reflector array 118. The retro-reflector array 118 may be used, for example, to allow for a thin ID-filter 112 implementation. The retro-reflector array 118 allows for the reflection area to be spread out so the ID-filter can be thinner. The retro-reflector array 118 can be used to increase a reflection aperture to help ensure that enough light returns to be analyzed by the receiver/polarimeter 136. An example window size is about 18 mm in diameter B, and elements of the retro-reflector array 118 can be positioned in a honey comb pattern or other pattern spaced by about 3.18 mm X by about 1.51 mm Y and by about 2.72 mm Z with a chamfer of about 0.127 mm B. Other distances and sizes can be used. A diameter of the retro-reflector array 118 may be a function of the allowed depth of the retro-reflector array 118.

Figure 7:
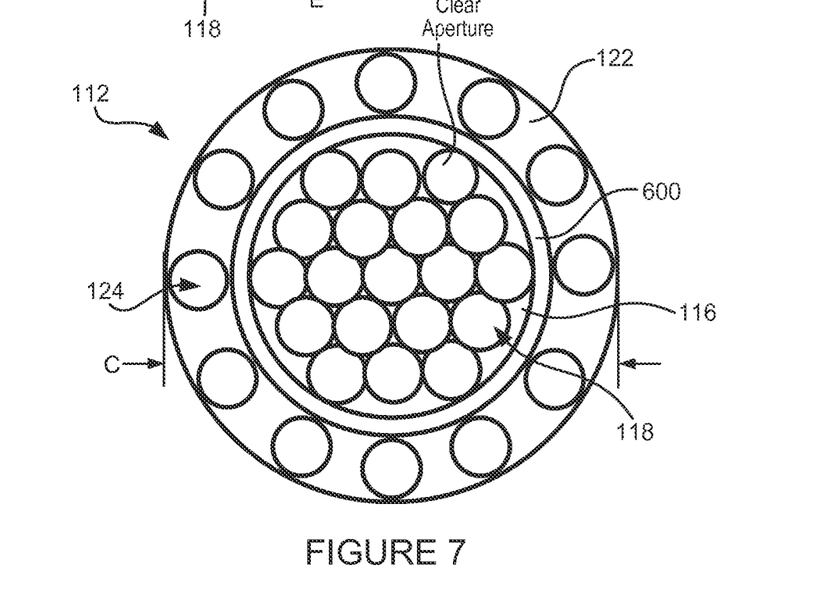
FIG. 7 is a diagram of an example ID-filter with an optical retarder element, an optical linear polarization element, and a retro-reflector array, where the linear polarization element defines a reference direction for the retarder element orientation.

FIG. 7 is a diagram of an example ID-filter 112 with a retarder filter 116 and a retro-reflector array 118, including a linear polarizer 122 to determine relative retarder and linear polarizer orientations, e.g. to provide additional identification addresses. The linear polarizer 122 can be mounted around the polarization filter 116 via a retainer housing 600. An example diameter C of the linear polarizer is about 25 mm. The polarization filter 116 can be about D, e.g., 1 mm, in thickness and the retro-reflector array 118 can be about E, e.g., 2.38 mm, in thickness. The retro-reflector array 118 may be implemented in a variety of ways, including corner cubes, reflective tape, paint, glass beads, aligned flat mirrors, etc.

Figure 8:
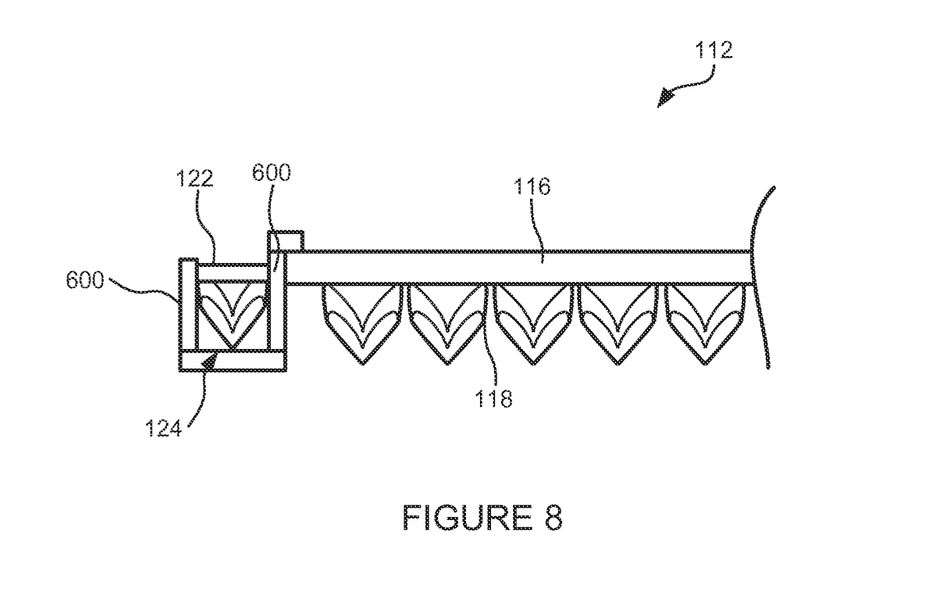
FIG. 8 is an exemplary side view of the ID-filter of FIG. 6.

FIG. 8 is an example partial side view of the ID-filter 112 of FIG. 7. The retarder filter 116 at wavelength $\lambda 1$ and retro-reflector array 118 at wavelength $\lambda 1$, along with linear polarizer 122 at wavelength $\lambda 2$ and retro-reflector array 124 at wavelength $\lambda 2$, can provide unique identification properties which, when positioned on the target 102, can be used to identify a target 102. The retro-reflectors 118, 124, or other reflector, reflect the light beam to a receiver/polarimeter 136 and detector 142 respectively, to analyze the returned light beam to determine an address of the ID-filter 112 and identify the target 102.

Advantages of the described systems and methods include non-contact identification of an object at very large standoff ranges using polarization and wavelength modulated light sources, a pre-applied unique and passive polarization and optionally spectral based light filter on the object, and a processing algorithm applied to the resulting signals. The systems and methods feature high bandwidth identification, especially when implemented with a laser light source, and have the potential of identification using a large library of object addresses. The systems and methods solve a problem of remote, non-contact, long range identification of an individual object in cases where the identifying feature on the object is completely passive and neither the object nor any features on the object are optically resolvable.

The systems and methods are applicable over large standoff ranges, e.g., 100's of kilometers or more. Another advantage of the systems and methods is that no source of electrical power at the location of the identified object is required. Another advantage of the systems and methods is the ability to perform remote individual object identification in cases where the light propagation medium or ranges between the transmit/receive station and the object to be identified preclude the use of optical feature imaging. The systems and methods offer remote object identification with a field of view much narrower than is possible with radio frequency based techniques due to the use of light wavelengths and the correspondingly smaller diffraction angles.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invented claimed is:

1. A system, comprising:
a first laser transmitter configured to form a first transmitted laser beam with a first wavelength;
a second laser transmitter configured for a second transmitted laser beam with a second wavelength different from the first wavelength;
a first laser receiver;
a second laser receiver;
an identification (ID)-filter including a retarder filter, a first reflector, a linear polarizer, and a second reflector, wherein the ID-filter is arranged such that the first transmitted laser beam passes through the retarder filter and is reflected by the first reflector towards the first laser receiver through the retarder filter to generate a first reflected laser beam and the second transmitted beam passes through the linear polarizer and is reflected by the second reflector towards the second laser receiver through the linear polarizer to generate a second reflected laser; and
a processor connected with a memory, the processor configured to execute instructions stored in the memory to determine polarization properties of the reflected beam with respect to the first transmitted laser beam to determine an address of the ID-filter and to process the second reflected laser to determine an orientation of the retarder filter for processing the first reflected laser beam to determine the address.

2. The system of claim 1, where the ID-filter includes a filter property.

3. The system of claim 1, where the ID-filter is positioned on a target to identify the target based on the determined address.

4. The system of claim 1, further including a receiver and a polarimeter connected with the processor, to the receiver to receive the reflected beam and the polarimeter to output a stokes vector.

5. The system of claim 1, where the linear polarizer includes a reference angle to determine an orientation of the retarder filter.

6. The system of claim 1, where the linear polarizer is coupled to the retarder filter.

7. The system of claim 1, where the first reflector comprises a retro-reflector.

8. The system of claim 1, where the first reflector comprises an array of retro-reflectors.

9. A method, comprising:
sending a first laser beam of a first wavelength to a retarder filter of the first wavelength;
reflecting the first laser beam after the first laser beam passes through the retarder filter to provide a first reflected laser beam;
receiving the first reflected laser beam;
processing the first reflected laser beam to determine an address of the retarder filter;
sending a second laser beam at a second wavelength to a linear polarizer;
reflecting the second laser beam after the second laser beam passes through the linear polarizer to provide a second reflected laser beam;
receiving the second reflected laser beam; and
processing the second reflected laser beam to determine an orientation of the retarder filter for processing the first reflected laser beam to determine the address.

10. The method of claim 9, further comprising identifying a target based on the address.

11. The method of claim 9, further comprising providing retro-reflective arrays configured to reflect the first laser beam and the second laser beam.

12. The method of claim 9, further comprising a filter to filter the first laser beam with the first wavelength before the first laser beam reaches a polarization filter.

13. An identification filter, comprising:
a first lambda filter at a first wavelength, the first lambda filter configured to receive a first laser beam at the first wavelength;
a polarization filter connected with the first lambda filter, the polarization filter comprising a retarder filter including a determined filter retardance;
a first reflector connected with the retarder filter, the first reflector to reflect the first laser beam back through the polarization filter and the first lambda filter to provide a first reflected laser beam, where the first reflected laser beam comprises a polarization property for providing an address;
a second lambda filter at a second wavelength, the second lambda filter configured to receive a second laser beam at the second wavelength;
a linear polarizer connected with the second lambda filter, the linear polarizer including a polarization orientation; and
a second reflector connected with the linear polarizer, the second reflector to reflect the second laser beam back through the linear polarizer and the second lambda filter to provide a second reflected laser beam, where the second reflected laser beam is used to provide a reference angle to determine an orientation of the retarder filter to provide an additional address.

14. The identification filter of claim 13, where the first reflector comprises an array of retro-reflectors.

15. The identification filter of claim 13, where the first reflector comprises a retro-reflector.

* * * * *